April 30, 1929.  W. C. BROADWELL  1,710,809
VEHICLE CUSHIONING OR SHOCK ABSORBING DEVICE
Filed March 21, 1925
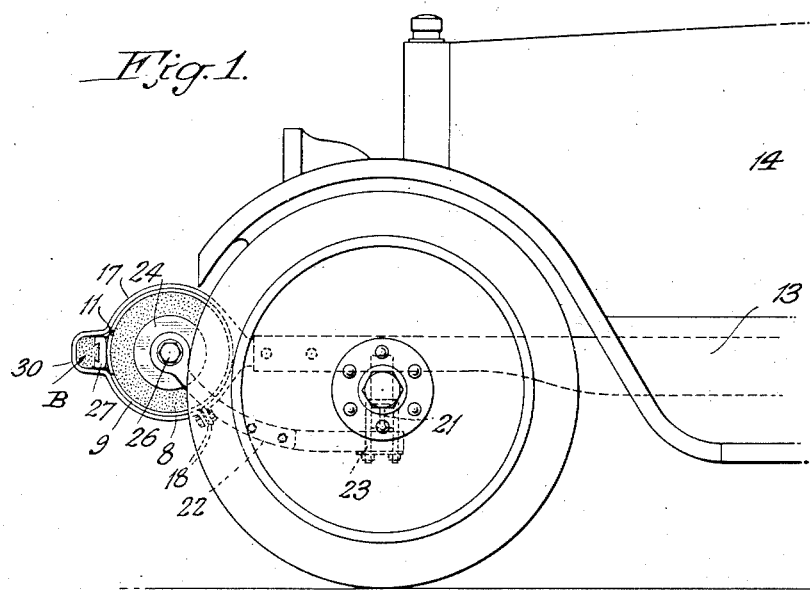
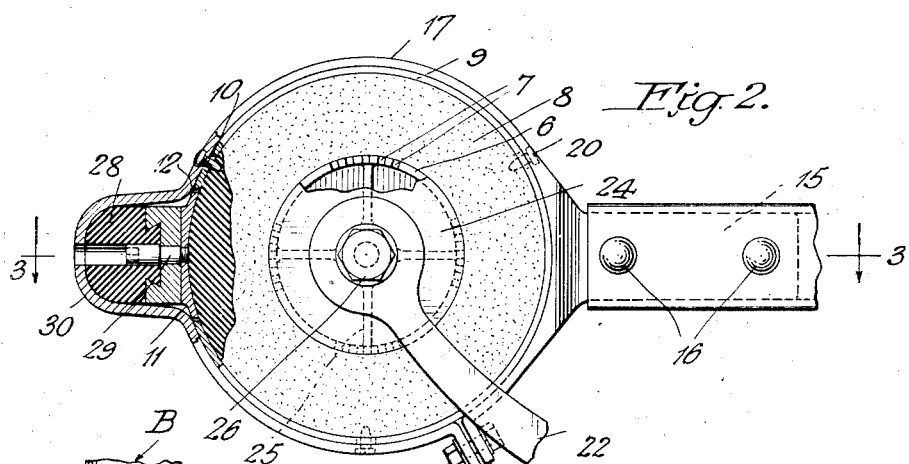
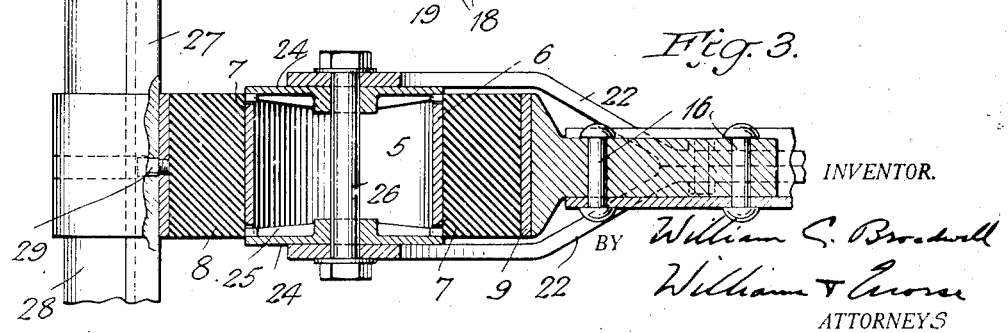
INVENTOR.
William C. Broadwell
BY William & Crosse
ATTORNEYS Patented Apr. 30, 1929.

1,710,809

UNITED STATES PATENT OFFICE.

WILLIAM C. BROADWELL, OF BROOKLYN, NEW YORK.

VEHICLE CUSHIONING OR SHOCK-ABSORBING DEVICE.

Application filed March 21, 1925. Serial No. 17,161.

This invention relates to vehicle cushioning or shock absorbing devices and is herein shown adapted for use in connection with automobiles.

An important object of the invention is to provide an improved device of the character mentioned which is simple in construction, easily installed, and reliable as well as effective in operation.

Other objects and certain advantages of the invention will become apparent from the following description when taken in connection with the accompanying drawings in which—

Figure 1 is a fragmental view in elevation of an automobile with which the device embodying my invention is shown.

Figure 2 is a face view of the device per se, certain portions thereof being broken away and shown in section.

Figure 3 is a horizontal sectional view taken on line 3—3 of Figure 2.

In practice as many of the devices embodying my invention may be employed in connection with the vehicle as there are wheels to the vehicle but I have herein shown only one such device and have illustrated the same as of a design particularly adapted for use in connection with automobiles.

The device embodying my invention is herein disclosed as comprising a hub 5 in the form of a cylindrical tube 6, the ends of which are provided with groups of notches 7, the function of which will hereinafter more clearly appear. To the peripheral surface of the hub 5 there is vulcanized, or otherwise suitably anchored, an annular ring of resilient material such as rubber 8. The peripheral face of the annular ring of rubber is likewise anchored to the inner surface of an embracing member 9 which is provided at spaced intervals with openings 10.

The device thus far described is adapted to be connected to the frame 13 of an automobile 14 by means of an arm 15. This arm may be permanently or otherwise secured to the frame by suitable fastening means such as rivets 16 or the like and terminates in a more or less resilient and contractile clamping member 17 provided at adjacent ends with lugs 18, through which a clamping device such as a bolt 19 or the like may be passed in order to permanently lock the embracing member 9 together with the ring of resilient material 8 in a fixed position. In order, however, to further insure the embracing member 9 against any undue movement, either rotary or axially, with respect to the clamping member 17 I have provided a plurality of lag bolts 20 which pass through the member 17 into openings 10 formed in the encircling member 9. The openings 10 are slightly elongated with respect to the periphery of the embracing member 9 to allow a certain necessary relative movement between this member and the clamping member 17 upon tightening the bolt 19.

In order to provide a suitable connection between the automobile axle 21 and the frame 13, I employ a pair of arms 22 which diverge from their point of connection with each other and thereafter extend in parallel planes to opposite sides of the hub. These arms are suitably connected to the axle 21, as by means of a U clamp 23, and are at their opposite ends suitably connected to end plates 24 arranged upon opposite ends of the hub 5. These end plates are suitably reinforced, as by means of radially projecting ribs 25, the opposite ends of which are adapted to fit into the diametrically opposed groups of notches 7. The end plates 24 are held or locked in intimate engagement with the opposite ends of the hub 5 by means of a bolt 26, the connection being such that any upward movement of the axle 21 with respect to the frame 13 will effect partial rotation of the hub 5 against the restraining action of the resilient material 8.

The reason for providing for a rotary adjustment of the end plates 24 with respect to the hub 5 may be readily appreciated when considering the fact that the greater the weight of the automobile, the further to the left must be the normal position of the arms 22, as viewed in Figure 1, before the weight of the automobile is let down upon the device to insure under a normal load, proper positioning of the axle with respect to the automobile frame. In order to make the desired adjustment of the plates 24, the bolt 26 may be removed to permit a slight separation of the arms 22, whereupon the plates are so rotated with respect to the hub 5 as to cause the arms 22 to assume the desired inclination. On the other hand, for example in the case of lighter automobiles, it might be necessary to adjust the end plates 24 in an anti-clockwise direction, as viewed in Figure 1, and if such an adjustment is required it may also be readily effected as will be clearly understood. Once the proper adjustment is made of the end plates 24, for a given automobile, the bolt 26 may be inserted and the end plates drawn into intimate engagement with the ends of the hub 5, the ribs 25 being adapted under such conditions to enter the notches 7 and thereby positively lock the plates against rotation with respect to the hub.

The device herein shown readily lends itself to association and cooperation with a bumper B adapted to extend transversely across the front of the automobile. The bumper, herein shown, comprises a metallic backing 27 faced with a rubber cushion 28 and is adapted to be suitably connected, at each end, to an abutment plate 11 by means of lag screws one of which is shown at 29. Each of the abutment plates is in direct contact with the cushioning material 8 and may be vulcanized or otherwise suitably connected thereto if desired. The bumper is held in position by means of a pair of yokes, one of which is shown at 30 as formed integral with the clamping member 17. Each yoke is of such dimensions, with respect to the bumper, that a snug fit is afforded prior to clamping the member 17 upon the embracing member 9. When the clamping member 17 is contracted, however, the yoke is at the same time urged into intimate engagement with the rubber facing 28 thereby normally locking the bumper in cooperative position with respect to the resilient material 8 which is adapted to yieldably resist any movement of the bumper when subjected to impact.

From the structure herein shown and described, it is apparent that the arms 22 are universally connected to the frame 13 since such arms are connected to the annular body of resilient material 8 at a point within its margin and are therefore permitted to yield in all directions. Such a universal connection of the arms 22 with the frame 13 is necessary for the reason that the arms 22 undergo not only a purely pivotal movement but also various other movements such as are caused, for example, when only one wheel of the vehicle passes over an obstruction and thereby lifts one end of the axle without affecting the other end thereof. Under all conditions of operation, the resilient material 8 tends to resist movement of the arms 22 from their normal positions for the reason that as a result of such movements certain strains and stresses are set up within the resilient material.

From the foregoing description it is obvious that the device embodying my invention may be employed as a substitute for the usual form of springs used in various types of vehicles, and particularly automobiles. Not only is my device adapted to be used as a substitute for spring suspensions generally employed, but it may also be effectively used in conjunction therewith as a shock absorber without departing from the spirit of the invention.

Having thus described my invention I claim:

1. In a cushioning device for a vehicle having an axle and a frame, an arm, one end of which is adapted to be connected to said axle whereas the other end is adapted to be connected to said frame and fulcrum about an axis, a hub secured to the fulcrumed end of said arm, an annular body of yieldable material surrounding said hub and secured thereto, and anchoring means secured to said frame and to said body in an embracing relation thereto at a point remote to said hub.

2. In a cushioning device for a vehicle having an axle and a frame, an arm, one end of which is adapted to be connected to said axle whereas the other end is adapted to be connected to said frame and fulcrum about an axis, a hub secured to the fulcrumed end of said arm, an annular body of yieldable material surrounding said hub and secured thereto, means securing said frame to said body at a point remote to said hub, and means for effecting an angular adjustment of said arm with respect to said hub.

3. In a cushioning device for a vehicle having an axle and a frame, an arm, one end of which is adapted to be connected to said axle whereas the other end is adapted to be connected to said frame and fulcrum about an axis, a hub secured to the fulcrumed end of said arm, a body of yieldable material embracing said hub and secured thereto, and anchoring means peripherally embracing said annular body and secured to the periphery thereof and to said frame.

4. In a cushioning device for a vehicle having an axle and a frame, an arm, one end of which is adapted to be connected to said axle whereas the other end is adapted to be connected to said frame and fulcrum about an axis, a hub secured to the fulcrumed end of said arm, a body of yieldable material embracing said hub and secured thereto, means embracing said annular body and secured to the periphery thereof and to said frame, and means for effecting an angular adjustment of said arms with respect to said hub.

5. In a cushioning device for a vehicle having an axle and a frame, an arm, one end of which is adapted to be connected to said axle whereas the other end is adapted to be pivotally connected to said frame, a hub, end plates secured to said arm and having interlocking engagement with said hub, an annular body of yieldable material anchored to the periphery of said hub, an embracing member surrounding said annular member and secured to the face thereof, and means for securing said embracing member to said frame.

6. In a cushioning device for a vehicle having an axle and a frame, an arm, one end of which is adapted to be connected to said axle whereas the other end is adapted to be connected to said frame and fulcrum about an axis, a body of yieldable material interposed between said frame and said arm for resisting fulcruming movement of said arm about said axis, and a bumper associated with said yieldable material, the yieldable material being adapted to so cooperate with said bumper as to yield under impacts imparted to said bumper.

7. In a cushioning device for a vehicle having an axle and a frame, an arm, one end of which is adapted to be connected to said axle whereas the other end is adapted to fulcrum about an axis, a body of yieldable material embracing said axis and connected to said arm, means for connecting said yieldable material to said frame whereby said arm is pivotally connected to said frame, and a bumper associated with said yieldable material, the yieldable material being adapted to so cooperate with said bumper as to yield under impacts imparted to said bumper.

8. In a cushioning device for a vehicle having an axle and a frame, an arm, one end of which is adapted to be connected to said axle whereas the other end is adapted to fulcrum about an axis, a body of yieldable material embracing said axis and connected to said arm, means for connecting said yieldable material to said frame whereby said arm is pivotally connected to said frame, means for effecting an adjustment of said arm with respect to said yieldable material, and a bumper associated with said yieldable material, the yieldable material being adapted to so cooperate with said bumper as to yield under impacts imparted to said bumper.

9. In a cushioning device for a vehicle having an axle and a frame, an arm, one end of which is adapted to be connected to said axle whereas the other end is adapted to be pivotally connected to said frame and fulcrum about an axis, means for pivotally connecting said other end of said arm to said frame and comprising a body of yieldable material having a portion thereof anchored to said arm and adapted to move therewith upon fulcruming movement thereof about said axis, means for connecting said yieldable material to said frame and for anchoring a portion of the yieldable material with respect to said frame whereby fulcruming movement of said arm is resisted by said yieldable material, and a bumper associated with said yieldable material, the yieldable material being adapted to so cooperate with said bumper as to yield under impacts imparted to said bumper.

10. In a cushioning device for a vehicle having an axle and a frame, an arm, one end of which is adapted to be connected to said axle whereas the other end is adapted to be pivotally connected to said frame and fulcrum about an axis, an annular body of yieldable material surrounding said axis and anchored to said arm and tending to move bodily about said axis upon fulcruming movement of said arm, means for connecting said annular body to said frame and for resisting bodily movement of said annular body, and a bumper associated with said yieldable material, the yieldable material being adapted to so cooperate with said bumper as to yield under impacts imparted to said bumper.

11. In a cushioning device for a vehicle having an axle and a frame, an arm, one end of which is adapted to be connected to said axle whereas the other end is adapted to be pivotally connected to said frame and fulcrum about an axis, an annular body of yieldable material surrounding said axis and anchored to said arm and tending to move bodily about said axis upon fulcruming movement of said arm, means for connecting said annular body to said frame and for resisting bodily movement of said annular body, means for effecting angular adjustment of said arm with respect to said body, and a bumper associated with said yieldable material, the yieldable material being adapted to so cooperate with said bumper as to yield under impacts imparted to said bumper.

12. In a cushioning device for a vehicle having an axle and a frame, an arm having one end connected to said axle, and a body of yieldable material to which said arm is centrally and adjustably connected and by which said arm is universally connected to said frame.

13. In a cushioning device for a vehicle having an axle and a frame, an arm having one end connected to said axle, and an annular body of yieldable material to which said arm is centrally and adjustably connected and by which said arm is universally connected to said frame, the peripheral portion of said body being anchored with respect to said frame whereby universal movement of said arm is resisted by said body.

In testimony whereof, I have affixed my signature to this specification.

WILLIAM C. BROADWELL.